(12) United States Patent
Nir-Buchbinder

(10) Patent No.: US 7,539,979 B1
(45) Date of Patent: May 26, 2009

(54) METHOD AND SYSTEM FOR FORCING CONTEXT-SWITCH DURING MID-ACCESS TO NON-ATOMIC VARIABLES

(75) Inventor: Yarden Nir-Buchbinder, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/060,148

(22) Filed: Mar. 31, 2008

(51) Int. Cl.
*G06F 9/44* (2006.01)
*G06F 11/00* (2006.01)

(52) U.S. Cl. ............................ 717/131; 717/130; 714/35

(58) Field of Classification Search ................ 717/130; 714/35
See application file for complete search history.

(56) References Cited

U.S. PATENT DOCUMENTS

| | | | |
|---|---|---|---|
| 6,405,326 | B1 | 6/2002 | Azagury et al. |
| 6,983,462 | B2 | 1/2006 | Savov et al. |
| 7,316,005 | B2 * | 1/2008 | Qadeer et al. ............... 717/131 |
| 2004/0172638 | A1 | 9/2004 | Larus et al. |
| 2005/0229178 | A1 | 10/2005 | Ballantyne |
| 2006/0161897 | A1 | 7/2006 | Biberstein et al. |
| 2007/0288900 | A1 | 12/2007 | Lev et al. |

OTHER PUBLICATIONS

Savage, S., Burrows, M., Nelson, G., Sobalvarro, P., and Anderson, T. 1997. Eraser: a dynamic data race detector for multithreaded programs. ACM Trans. Comput. Syst. 15, 4 (Nov. 1997), 391-411. DOI=http://doi.acm.org/10.1145/265924.265927.*
Flanagan, C. and Freund, S. N. 2000. Type-based race detection for Java. SIGPLAN Not. 35, 5 (May 2000), 219-232. DOI=http://doi.acm.org/10.1145/358438.34932.*
Choy, et al., "Reasoning with Non-Atomic Memories," Department of Computer Science, University of California at Santa Barbara, Aug. 3, 1993, Retrieved from Internet: http://www.cs.ucsb.edu/research/tech_reports/.
Edelstein, et al., "Multithreaded Java Program Test Generation," IBM Systems Journal, vol. 41, No. 1, 2002.

* cited by examiner

*Primary Examiner*—James Rutten
(74) *Attorney, Agent, or Firm*—Connolly Bove Lodge & Hutz LLP; Robert M. Trepp

(57) ABSTRACT

The invention provides an improved method for detecting concurrent bugs in multi-threaded software having at least one command to access a non-atomic variable. The non-atomic variable may have a plurality of memory words. In one approach, the method generally involves storing the memory words as atomic variables and replacing the at least one command to access the non-atomic variable with separate instructions to access each of the atomic variables. A thread-switch command is inserted between the atomic variable access commands to increase the likelihood of exposing and detecting synchronization problems.

7 Claims, 2 Drawing Sheets

METHOD AND SYSTEM FOR FORCING CONTEXT-SWITCH DURING MID-ACCESS TO NON-ATOMIC VARIABLES

BACKGROUND OF THE INVENTION

1. Field of the Invention

The present invention is directed toward software testing, and more particularly to methods and systems for testing for concurrent bugs in multi-threaded computer programs.

2. Background

A computer program may be described as a set of structures or modules, along with their respective relationships and interconnections. Due to the nature of such interconnections, a program may be also described as a hierarchy of several levels. The program set of structures may be distributed over these levels, where each structure is connected to one or more of the structures located in the level above it. Such a hierarchy may be defined by the order that these structures are to be executed. A computer program may contain two or more parallel structures, and a program's structure may include several levels each containing two or more parallel structures.

A thread is a sequence of structures that are to be executed one after the other in a sequential fashion. Thus, a thread may include a sequence of structures that belong to consecutive levels in the hierarchy and are connected to each other. The results generated during the execution of the ordered sequence of a program's structures are the thread's results.

Concurrent programs, also known as multi-threaded programs, may contain inter-thread conflicts that can result in errors or hanging conditions upon execution. Such errors can be particularly difficult to discover during the programming stage. An example of an inter-thread conflict is a data race between parallel threads wherein (1) there exists an execution of two threads such that the executing computer may arrive at a state for which there may be two threads which can execute, (2) both of these threads may access a common variable, and (3) at least one of the accesses may be a write access.

Known approaches to testing concurrent programs include concurrent noise injection, which involves systematically executing program scenarios that are likely to contain race conditions, deadlocks, and other intermittent bugs, collectively referred to as synchronization problems. For example, such techniques may generally involve instrumenting the program by inserting thread-switch forcing code in places that are likely to have concurrent bugs. Such known approaches may affect a program's behavior and thereby expose potential conflicts between threads.

However, such known techniques do not effectively deal with data races that may arise in the context of threads involving non-atomic variables that may have two or more memory words. The reason for this deficiency is that the variable access appears as one instruction, and therefore the instrumentation engine cannot insert thread-switch forcing code in the middle of this access. Accordingly, it would be desirable to provide a system and method that makes it possible to detect or manifest such races that may be associated with non-atomic variables.

SUMMARY OF THE INVENTION

The present invention addresses the shortcomings of the prior art methods and systems. In particular, the present invention is directed toward methods and systems for exposing concurrent bugs and synchronization problems in programs or software.

In accordance with one aspect of the embodiments described herein, there is provided a method for testing for concurrent bugs in a multi-threaded software. The method may comprise loading the software onto a computer, wherein the software includes a command to access a non-atomic variable. The non-atomic variable may include a first memory word and a second memory word. The method may further comprise replacing the non-atomic variable with a first atomic variable and a second atomic variable. The first memory word may be stored as the first atomic variable. The second memory word may be stored as the second atomic variable. The method may further comprise replacing the command to access the non-atomic variable with a first instruction to access the first atomic variable and a second instruction to access the second atomic variable. The method may further comprise inserting a thread-switching code or instruction between the first and second instructions, resulting in a modified version of the software. The method may further comprise running the modified version of the software on the computer to determine whether there are any concurrent bugs.

In accordance with another aspect of the embodiments described herein, there is provided a method for testing for concurrent bugs in a multi-threaded software having at least one command to access a non-atomic variable, the non-atomic variable comprising a first memory word and a second memory word. The method may comprise replacing the non-atomic variable with a first atomic variable and a second atomic variable. The first memory word may be stored as the first atomic variable. The second memory word may be stored as the second atomic variable. The method may further comprise replacing the at least one command to access the non-atomic variable with a first instruction to access the first atomic variable and a second instruction to access the second atomic variable. The method may further comprise: inserting a thread-switch code between the first and second instructions, thereby generating a modified software; and running the modified software to determine whether there are any concurrent bugs.

DETAILED DESCRIPTION

Figure 1:
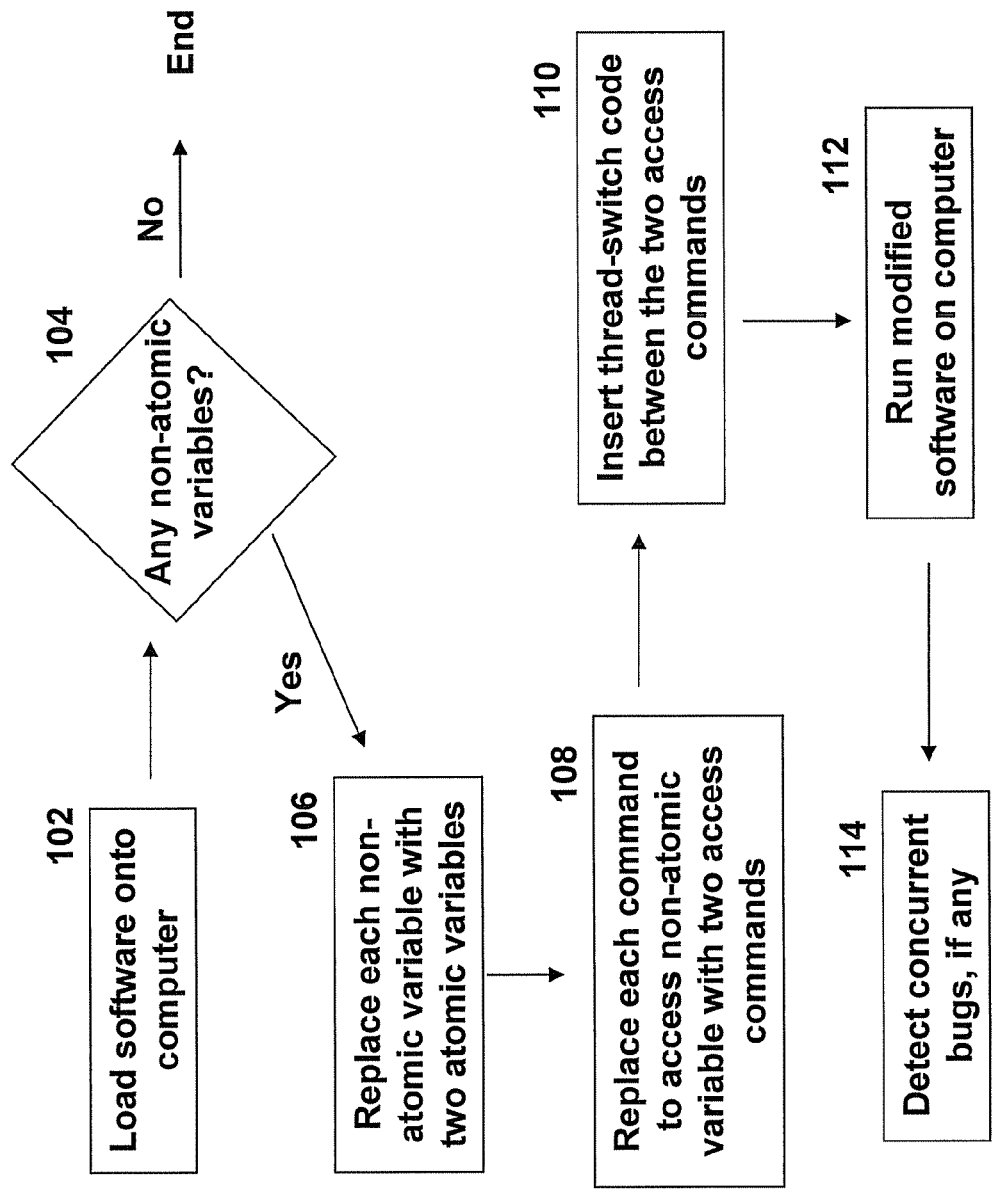
FIG. 1 is a flow diagram illustrating certain steps of an exemplary method for detecting concurrent bugs in a multi-threaded program.

The present invention addresses the need for a system and method for testing for concurrent bugs in multi-threaded programs or software. Such a system may implement protocols for replacing a given non-atomic variable with two or more atomic variables. An access to (i.e., a read from or write to) the non-atomic variable may be replaced with two accesses to two atomic variables. In addition, thread-switching code or noise may be injected between the two replacement operations.

For example, in the context of Java code instrumentation, there may be two types of non-atomic variable: long and double. Each variable of these types include two memory words. When reading or writing to such a non-atomic variable, it is possible that a thread-switch or context-switch may occur between accesses to the two words. Suppose one thread T1 assigns the value 1 to a certain shared-memory long variable, and another thread T2 assigns a value 2^33 to the shared-memory long variable. If the write were atomic, a subsequent read from the variable could see either one of these values (i.e., 1 or 2^33). This may be desired behavior of the program. Since it is not atomic, then due to possible thread-switch, the mixed values 2^33+1 or 0 can also be seen, which is typically a wrong behavior.

Assuming the existence of an exemplary shared memory variable foo of the type long, this variable may be replaced with two variables—namely, foo_h and foo_l of type int. The variables foo_h and foo_l represent the high-order and low-order words of foo, respectively.

For illustrative purposes, suppose the bytecode commands where intervention is desired include getfield/getstatic (read) and putfield/putstatic (write). It is noted that foo may be static or an instance member in other embodiments. Suppose the command getstatic foo loads the value to a stack. The command getstatic foo may be replaced with:

get static foo_h (load to stack)
    invoke-method noise (a call to the thread-switching causing code)
    getstatic foo_l (load to stack)
    invoke-method unite (clears the two ints from the stack and puts a long)

It is noted that unite is a method that takes two integers and unites them to long, thus:

Long unite (int h, int l){
      return ((long)h<<32) & 1;
    }

In the alternative, or in addition, instead of invoking unite, equivalent bytecode may be directly inserted into the program.

The command putstatic foo writes a long value which is on the stack into foo, removing the value from the stack. The command putstatic foo may be replaced with:

dup2 (have two copies of the long value on the stack)
    invoke-method getHighOrderWord (clears one long copy and puts an int)
    putstatic foo_h (clears the int)
    invoke-method noise
    invoke-method getLowOrderWord (clears the second long copy and puts an int)
    putstatic foo_l (clears the int)
    int getHighOrderWord (long l) {
      return (int) (l>>32);
    }
    int getLowOrderWord (long l) {
      return (int) (l>>32); //discards the high-order
    }

In the alternative, or in addition, the above described method may be replaced with equivalent bytecode inserted directly into the program.

It is noted that a variable of the type double may also be replaced with two ints. Access to such variables may be instrumented similarly to access to long variables, the difference being the methods unite, getHighOrderWord, and getLowOrderWord. The methods longBitsToDouble and doubleToLongBits from java.lang.Double may be used to convert between the long and the double representations.

Variables and objects of type long[] (array of longs) and double[] (array of doubles) may be replaced with variables and objects of type int[], initialized to double the length of the original array. Index 2i in the new array may represent the high-order word of index i of the original array, while index 2i+1 may represent the low-order word. Accesses to these calls (bytecode commands laload, lastore, daload, dastore) may be instrumented similarly to getstatic or putstatic, shown above.

Turning now to the context of C source instrumentation, sequences of operations (similar to the ones described above) may be used to replace the original read-to-global or write-to-global expressions. Such expressions may be syntactically embedded in larger expressions. The instrumentation may utilize comma-lists to replace an expression with a list of statements without affecting the original expression's content. One may assume, for example, that on a given platform, int and long are like in Java, wherein int is atomic, while long is not. One may assume that long includes two or more atomic units the size of int. Consider the following exemplary original code:

long global; (or struct/class member)
    void writeToGlobal( ) {
      . . .
      long local=global=someExpression( ); (most complex case–the write also returns a value)
      . . .
    }
    void readGlobal( ) {
      . . .
      local=5+global,
      . . .
    }

The above exemplary code may be modified as follows:

int global_h;
    int global_l;
    void writeToGlobal( ) {
      long tmpl; (added by instrumentation)
      . . .
      long local=
        (tmpl=someExpression( ),
        global_h=(int) (tmpl>>32),
        NOISE, (code to force context-switch)
        global_l=(int) tmpl,
        tmpl);
      . . .
    }
    Void readGlobal( ) {
      long tmpl; (added by instrumentation)
      . . .
      local=5+
        (tmpl=(long)global_h<<32,
        NOISE,
        tmpl &=(long)global_l)
      . . .
    }

It is noted that tmpl may be added to each function that reads from or writes to a long global variable. If the function accesses more than one global, the same tmpl can be used for all of them (it may be used locally for each access). Such instrumentation is believed to be straightforward with instrumentation engines that are syntax-sensitive, such as for example the ROSE preprocessor generation tool described in further detail at https://e-reports-ext.llnl.gov/pdf/237284.pdf. The approach described herein may be modified for use with non-atomic floating point types (double) and with arrays of non-atomic types, as described above with respect to Java bytecode. In general, the instrumentation applied to C source may similarly be applied to Java source or the like. Where comma lists are not available or used, as in Java source, a function argument list computation may be used to achieve the same effect. For example, in writeToGlobal( ), the assignment may be changed to:

long local=longAssignment (tmpl=someExpression( ), global_h=tmpl>>32, NOISE,
 global_l=tmpl & 0x0000FFFF);

To which the following method may be supplied:

long longAssignment (long aux, int h_dummy, int noise_dummy, int l_dummy) {
 return aux;
 }

It is noted that the NOISE code may be refactored to a method of returning a meaningless value, so that it may be given as a method argument.

As shown in the exemplary codes and embodiments provided above, the high-order word may be handled before the low-order word. In the alternative, or in addition, the low-order word may be handled before the high-order word. For example, the instrumentation may be adapted to insert two sequences of instructions that represent the two possible orders, each in a different branch of a conditional statement. A noise engine or the like may be adapted to decide dynamically which order to choose.

The exemplary codes and embodiments provided above are for non-atomic variables having two atomic components. In the alternative, or in addition, the techniques described herein may be used to substitute non-atomic variables having more than two atomic components. The instrumentation mechanisms and techniques described herein may be adapted for use C intermediate representation, binaries, etc.

In accordance with one aspect of the embodiments described herein, there is provided a method for detecting the presence of concurrent bugs in a program or software by injecting noise or thread-switch codes/instructions in between the words that make up a long or non-atomic variable. The method may involve providing instrumentation that replaces the non-atomic variable with a plurality of atomic variables. The number of atomic variables used to substitute the non-atomic variable mat be equal to the number of words in the non-atomic variable.

For example, a non-atomic variable with two words may be replaced with two atomic variables. Each read from (write to) the non-atomic variable may be replaced with two reads from (writes to) the two local or atomic variables. The thread-switching code may be injected between these two operations.

With reference to FIG. 1, there are provided certain steps of an exemplary method for testing for concurrent bugs in a multi-threaded program, wherein the software is partitioned into structures or modules, of which at least one structure is parallel to at least one other structure. The software that is to be tested may be loaded onto a computer, computing device, or the like (step 102). The software comprises at least one command to access a non-atomic variable that includes a plurality of memory words. It is assumed for the present example, that the non-atomic variable has two memory words; however, it is noted that the non-atomic variable may have more than two memory words in other embodiments.

At step 104, the method may involve determining whether there are any non-atomic variables and identifying them. If not, the process ends; otherwise, the method proceeds to step 106 where each of the identified non-atomic variables may be replaced or substituted with two atomic variables. Specifically, the first and second memory words may be stored in first and second atomic variables, respectively. At step 108, a command to access the non-atomic variable may be replaced with two commands or instructions, including a first instruction to access the first atomic variable and a second instruction to access the second atomic variable.

Next, at step 110, a thread-switch code or instruction is inserted between the first and second instructions, thereby increasing the likelihood of exposing concurrent bugs in the software. Steps 106 through 110 result in a modified version of the software. The modified software is run on the computer (step 112) to see if any synchronization problems are presented. At step 114, the concurrent bugs, if any, are exposed and detected. The modified software may be run on the same computer as in step 102. In the alternative, or in addition, the modified software may be run on a different computer.

Figure 2:
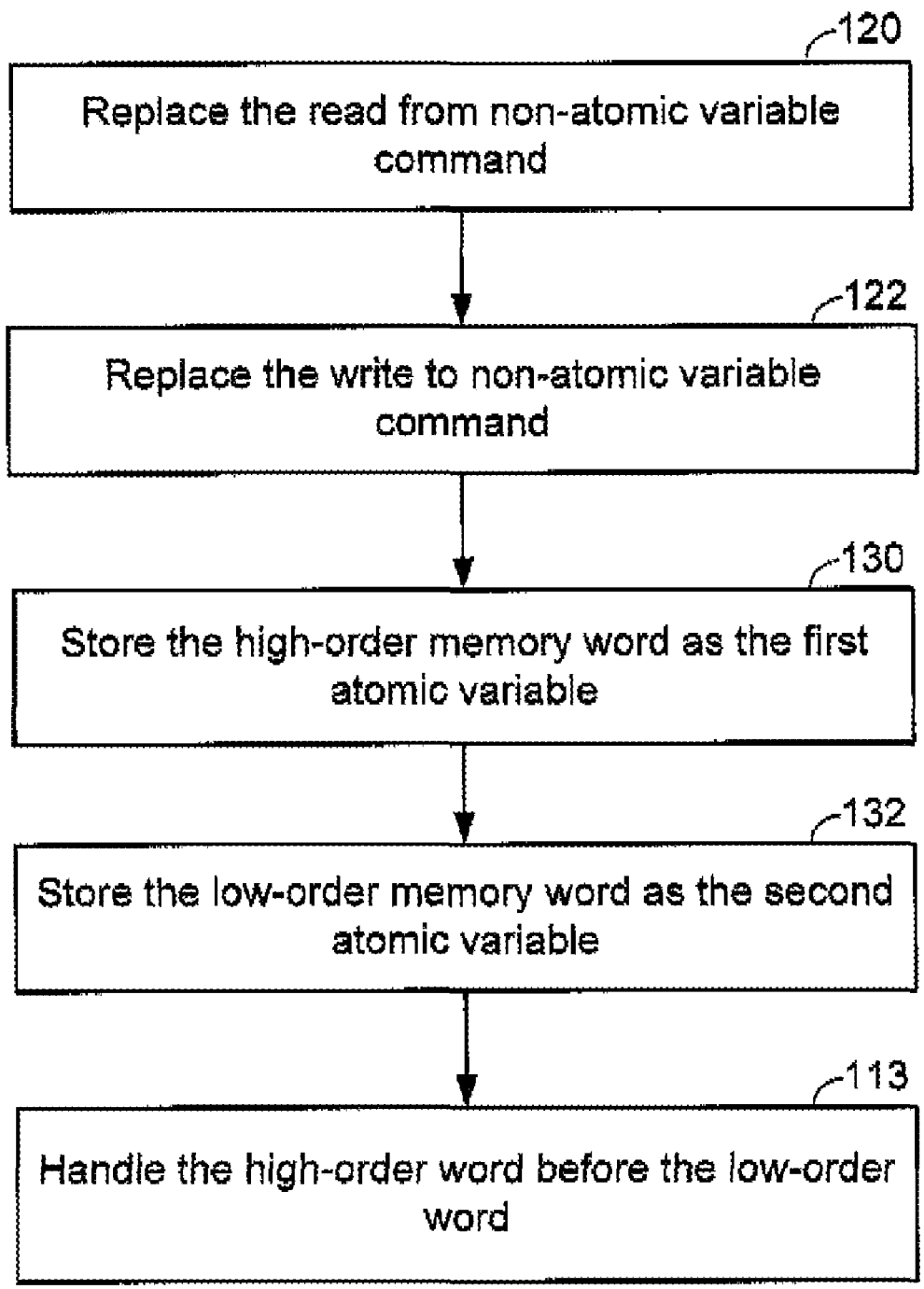
FIG. 2 provides a flow diagram of an exemplary method for detecting concurrent bugs in a multi-threaded program, wherein the command to access a given non-atomic variable may include or be replaced with a read from command or a write to command.

With reference to the embodiment of FIG. 2, the command to access a given non-atomic variable may include or be replaced with a read from command 120 or a write to command 122. In one embodiment, step 106 may comprise storing a high-order memory word as the first atomic variable 130 and/or storing a low-order memory word as the second atomic variable 132. Step 112 may involve handing the high-order word before the low-order word 113.

In the alternative, step 106 may comprise storing a low-order memory word as the first atomic variable and/or storing a high-order memory word as the second atomic variable. Step 112 may involve handing the low-order word before the high-order word.

The embodiments described herein may take the form of an entirely hardware embodiment, an entirely software embodiment, or an embodiment containing both hardware and software elements. The invention may be implemented in software, which includes but is not limited to firmware, resident software, microcode, and the like. Furthermore, the embodiments described herein may take the form of a computer program product accessible from a computer-usable or computer-readable medium providing program code for use by or in connection with a computer or any instruction execution system.

For the purposes of this description, a computer-usable or computer readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks may include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

What is claimed is:

1. A method for testing for concurrent bugs in a multi-threaded software, comprising:
    loading the software onto a computer, the software comprising a command to access a non-atomic variable, the non-atomic variable comprising a first memory word and a second memory word;
    replacing the non-atomic variable with a first atomic variable and a second atomic variable;
    storing the first memory word as the first atomic variable;
    storing the second memory word as the second atomic variable;
    replacing the command to access the non-atomic variable with a first instruction to access the first atomic variable and a second instruction to access the second atomic variable;
    inserting a thread-switching code between the first and second instructions, wherein control is passed from a first thread related to the first and second instructions to a second thread of the multi-threaded software that is unrelated to the first and second instructions, thereby generating a modified version of the software; and
    running the modified version of the software on the computer to determine whether there are any concurrent bugs related to the non-atomic variable.

2. The method of claim 1, wherein replacing the command to access the non-atomic variable comprises replacing a read command.

3. The method of claim 1, wherein replacing the command to access the non-atomic variable comprises replacing a write-to command.

4. The method of claim 1, wherein storing the first memory word as the first atomic variable comprises storing a high-order word as the first atomic variable.

5. The method of claim 4, wherein storing the second memory word as the second atomic variable comprises storing a low-order word as the second atomic variable.

6. The method of claim 5, wherein running the modified version of the at least one module comprises handling the high-order word before the low-order word.

7. A computer readable storage medium for storing a computer program that makes a computer execute:
    replacing the non-atomic variable with a first atomic variable and a second atomic variable;
    storing the first memory word as the first atomic variable;
    storing the second memory word as the second atomic variable;
    replacing the at least one command to access the non-atomic variable with a first instruction to access the first atomic variable and a second instruction to access the second atomic variable;
    inserting a thread-switch code between the first and second instructions, wherein control is passed from a first thread related to the first and second instructions to a second thread of the multi-threaded software that is unrelated to the first and second instructions, thereby generating a modified software; and
    running the modified software to determine whether there are any concurrent bugs related to the non-atomic variable.

* * * * *